Dec. 12, 1933.  J. L. WOODBRIDGE  1,938,989
FILLING VENT FOR STORAGE BATTERY CELLS
Filed March 1, 1930

WITNESS:
Robt R Mitchel

INVENTOR
Joseph Lester Woodbridge
BY
Augustus B. Stoughton.
ATTORNEY.

Patented Dec. 12, 1933

1,938,989

UNITED STATES PATENT OFFICE 1,938,989

FILLING VENT FOR STORAGE BATTERY CELLS

Joseph Lester Woodbridge, Philadelphia, Pa.

Application March 1, 1930. Serial No. 432,514

5 Claims. (Cl. 136—177)

One object of the invention is to provide a filling vent which will permit filling the cell to the proper level with a simple type of filling syringe under conditions where the level of the electrolyte in the cell cannot readily be observed. Another object of the invention is to provide such a filling vent which will permit the filling liquid to flow rapidly into the cell and allow the corresponding volume of gas to escape. Another object of the invention is to provide such a filling vent which will act also as a spray trap to prevent the escape of spray thrown from the surface of the liquid during the gassing period of charge by the breaking of gas bubbles. Another object is to provide such a filling vent, which can readily be removed for taking hydrometer readings.

My invention will be more clearly understood by reference to the accompanying drawing, in which, Figure 1 shows in sectional elevation a cell provided with a filling vent embodying the invention.

Figure 1:
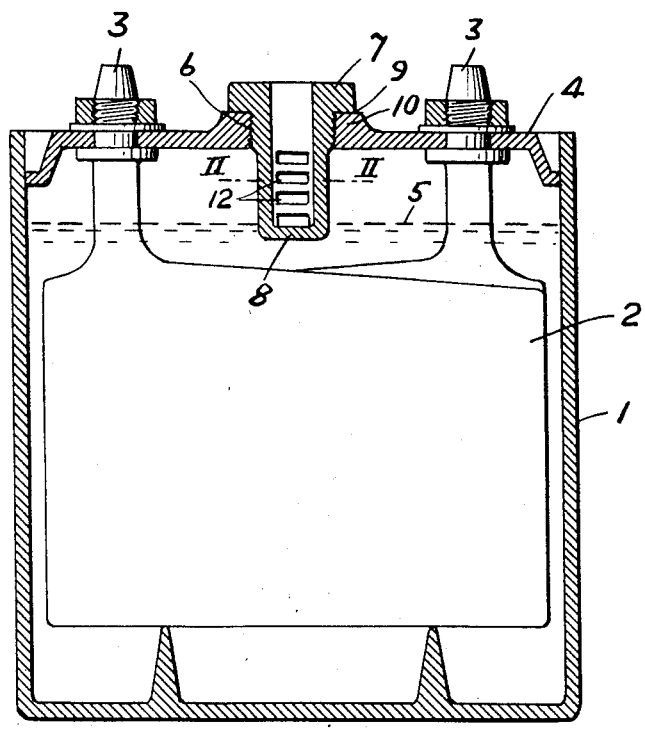
Figure 2:
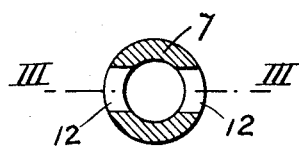
Figure 2 shows a cross section of the filling vent on the line II, II of Figure 1.

In Figure 1, the numeral 1 represents the container of a conventional storage battery cell in which are plates 2 having terminal posts 3, passing through the cover 4. The normal electrolyte level is shown by the line 5. The cover has a threaded opening 6, into which is screwed the filling vent 7. This vent is in the form of a cylinder having a closed bottom 8 and shouldered at 9 to seat on the boss 10 of the cover. The filling vent 7 extends below the under side of the cover to a distance such that the upper surface of the bottom 8 is at the normal level of the electrolyte, corresponding with the line 5. In opposite sides of the filling vent below the cover are shown horizontal slots 12 which serve to permit liquid to flow into the cell during the filling operation and allow the escape of the gas from the space above the electrolyte in the cell.

Figure 4:
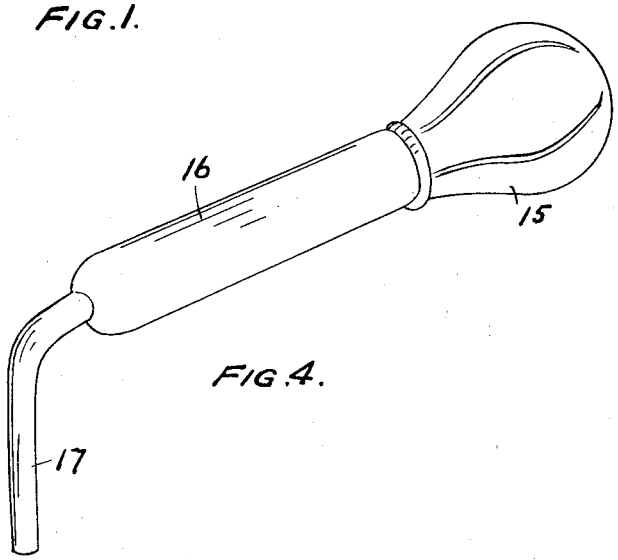
Figure 4 shows a simple filling syringe which may conveniently be used for filling the cell shown in Figure 1.

The filling syringe shown in Figure 4 may be conveniently used for filling the cell, this syringe being provided with a rubber bulb 15 attached to one end of the barrel 16, the latter being provided with a depending nozzle of reduced diameter 17. The nozzle 17 is adapted to be inserted into the filling vent and to extend to the bottom thereof during the filling operation. On compressing the bulb 15, the syringe having previously been filled with liquid, the liquid is forced out and flows through one or more of the lower slots of the filling vent into the cell, the gas escaping through the upper slots. The bulb may then be released without removing the syringe from the vent, whereupon if the cell has been over filled, liquid will be withdrawn until the level falls to the desired point at the line 5. If no liquid is withdrawn, indicating that insufficient liquid has been added to the cell, the operation may be repeated after refilling the syringe until it is found that on releasing the rubber bulb, liquid is drawn back into the barrel 16.

From the above description, it will be seen that the cell may be properly filled to the desired level, even though the level of the liquid in the cell cannot be observed.

Figure 3:
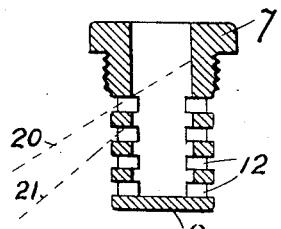
Figure 3 is a vertical section of the vent on the line III, III of Figure 2.

The slots 12 are designed of such width in proportion to the thickness of the walls of the cylinder that spray thrown up from the surface of the electrolyte in the cell will strike the under surfaces of the slots, acting as baffles and be prevented from passing out of the vent. This is illustrated in Figure 3 by the dotted lines 20 and 21, which may be taken to represent the path of particles of spray. If one of these particles should be traveling at so great an angle from the vertical, as shown by the line 20, so as to pass through one of the slots, it would strike the opposite wall of the vent. If it should follow a path at a lesser angle to the vertical, as shown by the line 21, it would strike the under surface of one of the slots.

I claim:

1. A venting and filling device for a liquid container having a closure and adapted to contain liquid to a normal level, said device comprising a tubular duct passing through and attached to the closure and having an opening occupying the greater part of its top surface and closed at the bottom substantially at the normal level of liquid in the container and having horizontal slots in its lateral walls, whereof one is located at the normal liquid level and another is located above said level.

2. A venting and filling device for a liquid container having a closure and adapted to contain liquid to a normal level, said device comprising a tubular duct passing through and attached to the closure and having an opening occupying the greater part of its top surface and closed at the bottom substantially at the normal level of liquid in the container and having openings in its lateral walls, whereof one is located at the normal liquid level and another is located above said level, the height of said openings being proportioned with respect to the thickness of said walls to prevent the escape of liquid in a straight line from said container.

3. A venting and filling device for a liquid container, having a closure and adapted to contain liquid to a normal level, said device comprising a substantially cylindrical duct passing through and attached to the closure and having an opening at the top substantially equal in area to the cross-sectional area of the duct and having a stop at the bottom adapted to locate the lower end of the nozzle of a filling syringe substantially at the normal liquid level and having horizontal slots in its lateral walls whereof the lowest is located at the normal liquid level.

4. A venting and filling device for a liquid container, having a closure and adapted to contain liquid to a normal level, said device comprising a substantially cylindrical duct passing through and attached to the closure and having an opening at the top substantially equal in area to the cross sectional area of the duct and having a stop at the bottom adapted to locate the lower end of a filling syringe substantially at the normal liquid level and having openings in its lateral walls whereof the lowest is located at the normal liquid level, the height of said openings being proportioned with respect to the thickness of said walls to prevent the escape of liquid in a straight line from said container.

5. A venting and filling device for a liquid container which has a closure and which is adapted to contain liquid to a normal level, said device having a tubular duct passing through said closure, said duct having an unobstructed opening adjacent its upper end substantially equal in area to the cross sectional area of the duct and adapted to receive the nozzle of a filling syringe, a stop adjacent the lower end of said duct adapted to locate the lower end of said nozzle at the normal liquid level, said duct having orifices at different levels opening into said container, all of said orifices being located at and above the normal liquid level and the lowest of said orifices being located at the normal liquid level, the ratio of the heights of said orifices to the thickness of the walls of said duct being such that liquid cannot escape in a direct line through said orifices and the upper opening of said duct.

JOSEPH LESTER WOODBRIDGE.